US012673850B1

(12) United States Patent
Miniello et al.

(10) Patent No.: US 12,673,850 B1
(45) Date of Patent: Jul. 7, 2026

(54) SMART HOOK WITH TUMBLER CLASP MECHANISM

(71) Applicant: The United States of America, as represented by the Secretary of the Navy, Arlington, VA (US)

(72) Inventors: Nikko S. Miniello, Virginia Beach, VA (US); Thaddeus J. Sadowski, Hampton, VA (US); Samuel H. Cecchetti, Norfolk, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 749 days.

(21) Appl. No.: 18/128,887

(22) Filed: Mar. 30, 2023

Related U.S. Application Data

(60) Provisional application No. 63/325,181, filed on Mar. 30, 2022.

(51) Int. Cl.
*B66C 1/36* (2006.01)
*B66C 1/38* (2006.01)

(52) U.S. Cl.
CPC . *B66C 1/36* (2013.01); *B66C 1/38* (2013.01)

(58) Field of Classification Search
CPC .................................... B66C 1/36; B66C 1/38
See application file for complete search history.

(56) References Cited

U.S. PATENT DOCUMENTS 235,438 A * 12/1880 Hunter ...................... B66C 1/36
278/75

* cited by examiner

*Primary Examiner* — Daniel Jeremy Leeds
(74) *Attorney, Agent, or Firm* — Howard Kaiser; Jesus J. Hernandez; U.S. Department of the Navy, Office of the General Counsel

(57) ABSTRACT

An exemplary inventive attachment device coaxially combines an inner near-cylinder and an outer near-cylinder so that the inner near-cylinder is rotationally adjustable with respect to the outer near-cylinder. The inner and outer near-cylinders are each approximately "C"-shaped so as to be provided with a longitudinal void. The inner near-cylinder has been rotated to an "open" position when the respective voids of the inner and outer near cylinders are approximately aligned so as to describe essentially the same void. The inner near-cylinder has been rotated to a "closed" position when the inner near cylinder's void is approximately opposite (e.g., approximately 180 degrees apart from) the outer near cylinder's void. While the inner near-cylinder is in the closed position, a spring device exerts a force upon a blocking member so as to move the blocking member at least partially inside the inner near cylinder's void, the blocking member thereby constituting an impediment that prohibits rotation of the inner near-cylinder.

2 Claims, 10 Drawing Sheets

SMART HOOK WITH TUMBLER CLASP MECHANISM

STATEMENT OF GOVERNMENT INTEREST

The inventorship of the invention described herein includes at least one person who invented the invention in performance of the person's official duties as an employee of the United States Department of the Navy. The invention may be manufactured, used, and licensed by or for the Government of the United States of America for governmental purposes without payment of any royalties thereon or therefor. The Government of the United States of America has ownership rights or interests in the invention.

BACKGROUND OF THE INVENTION

The present invention relates to hooking mechanisms, more particularly to those that may be used under circumstances, such as involving tight spaces or large objects, in which manual attachment may be difficult or dangerous.

A conventional hooking mechanism, such as a shackle or a hook, requires manual attachment and locking of the connection. A shackle-type hooking mechanism (e.g., a normal shackle) or a hook-type hooking mechanism (e.g., a curved hook) may be difficult to implement or may be otherwise unsuitable.

For instance, a conventional shackle mechanism or a conventional hook mechanism may pose practical difficulties in tight spaces within small craft, where tradeoffs had to be made within the design to accommodate large open area around the connection points, such as a pad eye, with ample room for a pin to be pulled out to allow for the attachment and removal of a shackle. As another example, use of a shackle mechanism or a hook mechanism may be problematical in situations involving manual grabbing of a UUV strong back from onboard a small vessel, wherein multiple personnel are equipped with Shepard and boat hooks to then manually affix a carabineer to the connection point. Furthermore, a shackle mechanism or a hook mechanism may be impractical in spaces in which the object desired to be captured is large, heavy, and/or cumbersome and there is a potential to harm the person affixing or removing the hook from the object, especially in scenarios in which the environment is harsh (e.g., more severe sea states). Generally, use of a shackle mechanism or a hook mechanism may be inadvisable where physical attachment may put a person in harm's way.

SUMMARY OF THE INVENTION

In view of the foregoing, an object of the present invention is to provide a hooking mechanism that is more practical for many applications.

The present invention, as exemplarily embodied, provides a practical methodology for manually or autonomously actuating a hooking mechanism. According to exemplary inventive practice, an inventive device features, inter alia, a straight opening that facilitates ease of alignment to the hooking point, but still allows for full capture and containment of the captured point.

An example of an inventive hooking apparatus includes a generally cylindrical inner structure, a generally cylindrical outer structure, a spring device, and a blocking member. The generally cylindrical inner structure and the generally cylindrical outer structure are coaxially combined. The generally cylindrical inner structure is characterized by a "C"-shaped cross-section and a longitudinal opening extending at least a portion of the length of the generally cylindrical inner structure. The generally cylindrical outer structure is characterized by a "C"-shaped cross-section and a longitudinal opening extending at least a portion of the length of the generally cylindrical outer structure. The spring device and the stoppage member are connected to each other. The generally cylindrical inner structure is rotatable relative to the generally cylindrical outer structure. Based on the rotatability, the generally cylindrical inner structure is capable of being set in an open position and a closed position. According to the open position, the longitudinal opening of the generally cylindrical inner structure and the longitudinal opening of the generally cylindrical outer structure are aligned with each other. According to the closed position, the longitudinal opening of the generally cylindrical inner structure is rotated so that the longitudinal opening of said generally cylindrical inner structure is situated approximately 180 degrees from where the longitudinal opening of the generally cylindrical inner structure is situated according to the open position. During the closed position, the blocking member is caused by the spring device to move into the longitudinal opening of the generally cylindrical inner structure so as to at least substantially prevent rotation of the generally cylindrical inner structure.

Inventive practice is possible for multifarious applications, and may be particularly useful for applications in which it would be advantageous to effect autonomous and physical capture and release of any hooking point, such applications including but not limited to those involving small craft, unmanned underwater vehicles, and unmanned surface vehicles. Exemplary practice of the present invention effects autonomous capture and containment of objects in difficult-to-reach places or dangerous locations. The present invention's rotatable opening allows the captured element to translate directly/linearly into the hooking mechanism without the need to maneuver around a hook. Depending on the inventive embodiment, the inventive engagement of a captured element can be autonomous or remotely controlled, if required.

Inventive practice may be especially propitious in applications involving limited or confined spaces, manipulation by people onboard small vessels, sizeable or weighty objects, and/or personal risk. For instance, the present invention's autonomous actuation and direct open alignment can allow for minimal space impacts within small craft. Inventive practice can facilitate manual clutching of objects onboard small craft so as to simplify remote alignment and connection to the lifting point. Inventive practice may be beneficial when the object to be captured is large/heavy/cumbersome and there is potential for harming the person affixing or removing the hook from the object, particularly in harsher environments (e.g., more severe sea states). Under these and other kinds of adverse circumstances, inventive practice may represent an automated solution that is capable-such as by providing for autonomous or remote operation—of reducing or eliminating personal risk.

For instance, the present invention's tumbler clasp mechanism, as exemplarily embodied, allows the smart hook to capture and release a payload with a clear, straight opening. The functionality of the present invention's tumbler clasp mechanism, in terms of nature and degree of human intervention, depends on the inventive embodiment and its intended application. Depending on the inventive embodiment, the contemplated utilization may be autonomous or remotely controlled (e.g., via computer), or may be physically effectuated by a human. If remote or automatic operation is not a requirement, then the inventive device may be directly actuated by human physical exertion. In practicing the present invention, the selection of materials will often be limited based on the intended environment of use and lifting load.

BRIEF DESCRIPTION OF THE DRAWINGS

The present invention will now be described, by way of example, with reference to the accompanying drawings, wherein:

As shown in FIG. 1, the present invention's "tumbler clasp mechanism" is assembled and closed.

As shown in FIG. 3, the inventive tumbler clasp mechanism is "open."

As shown in FIG. 4, the present invention's "smart hook prototype" is assembled.

As shown in FIG. 6A, the inventive smart hook prototype is "open."

As shown in FIG. 6B, the inventive smart hook prototype is "closed."

FIG. 7A is similar to the view of FIG. 6A; however, as distinguished from FIG. 6A, the front-facing inner cylinder (9) and the locking mechanism (10) are removed for illustrative purposes in FIG. 7A. As shown in FIG. 7A, the inventive smart hook prototype is "open."

FIG. 7B is similar to the view of FIG. 6B; however, as distinguished from FIG. 6B, the front-facing inner cylinder (9) and the locking mechanism (10) are removed for illustrative purposes in FIG. 7B. As shown in FIG. 7B, the inventive smart hook prototype is "closed."

As shown in FIG. 8, the inventive smart hook prototype is "closed."

As shown in FIG. 9, the inventive smart hook prototype is attached to the UUV and is "open."

DESCRIPTION OF EXEMPLARY EMBODIMENTS OF THE INVENTION

Figure 1:
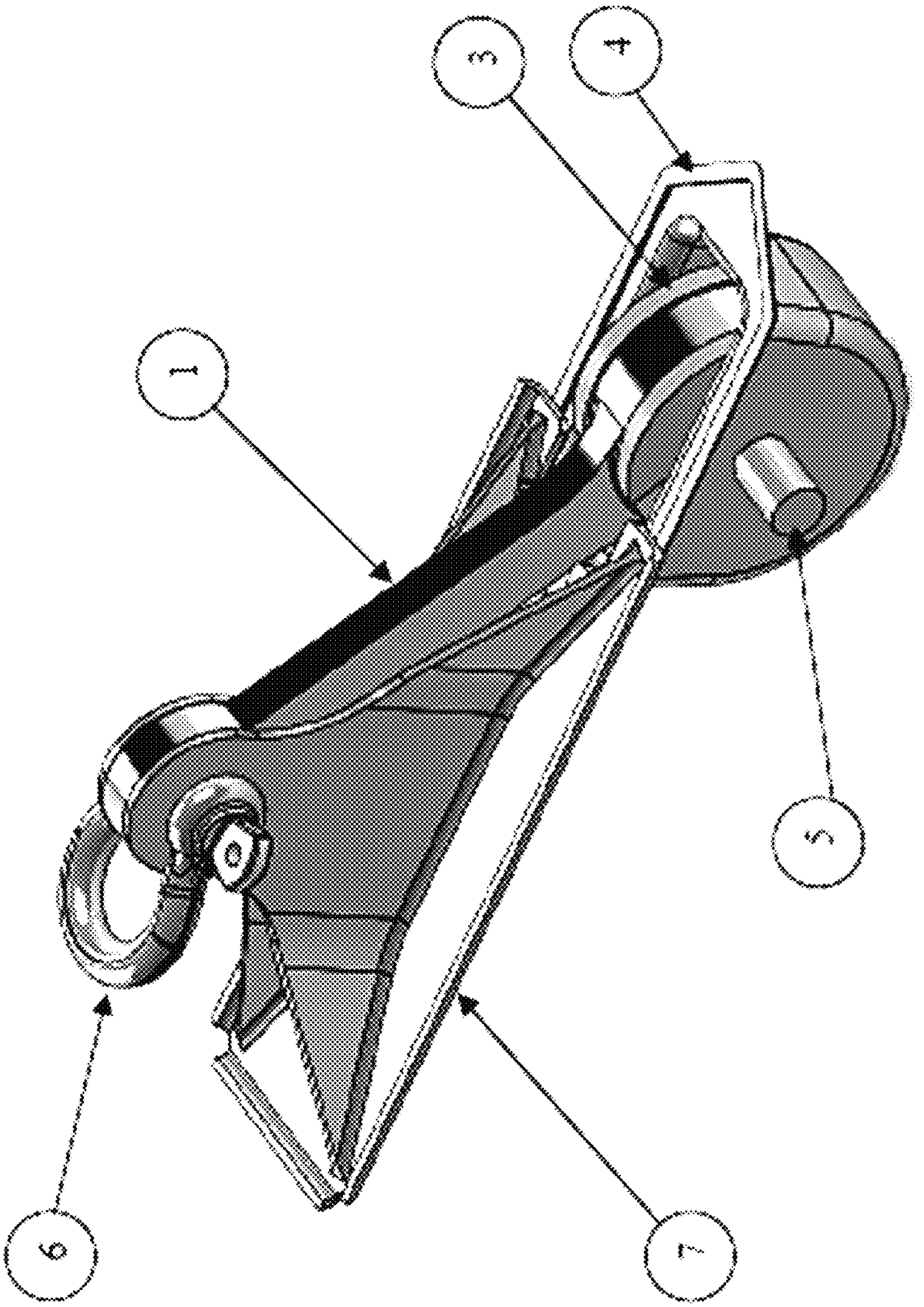
FIG. 1 is a perspective view of a first example of practice in accordance with the present invention.
Figure 2:
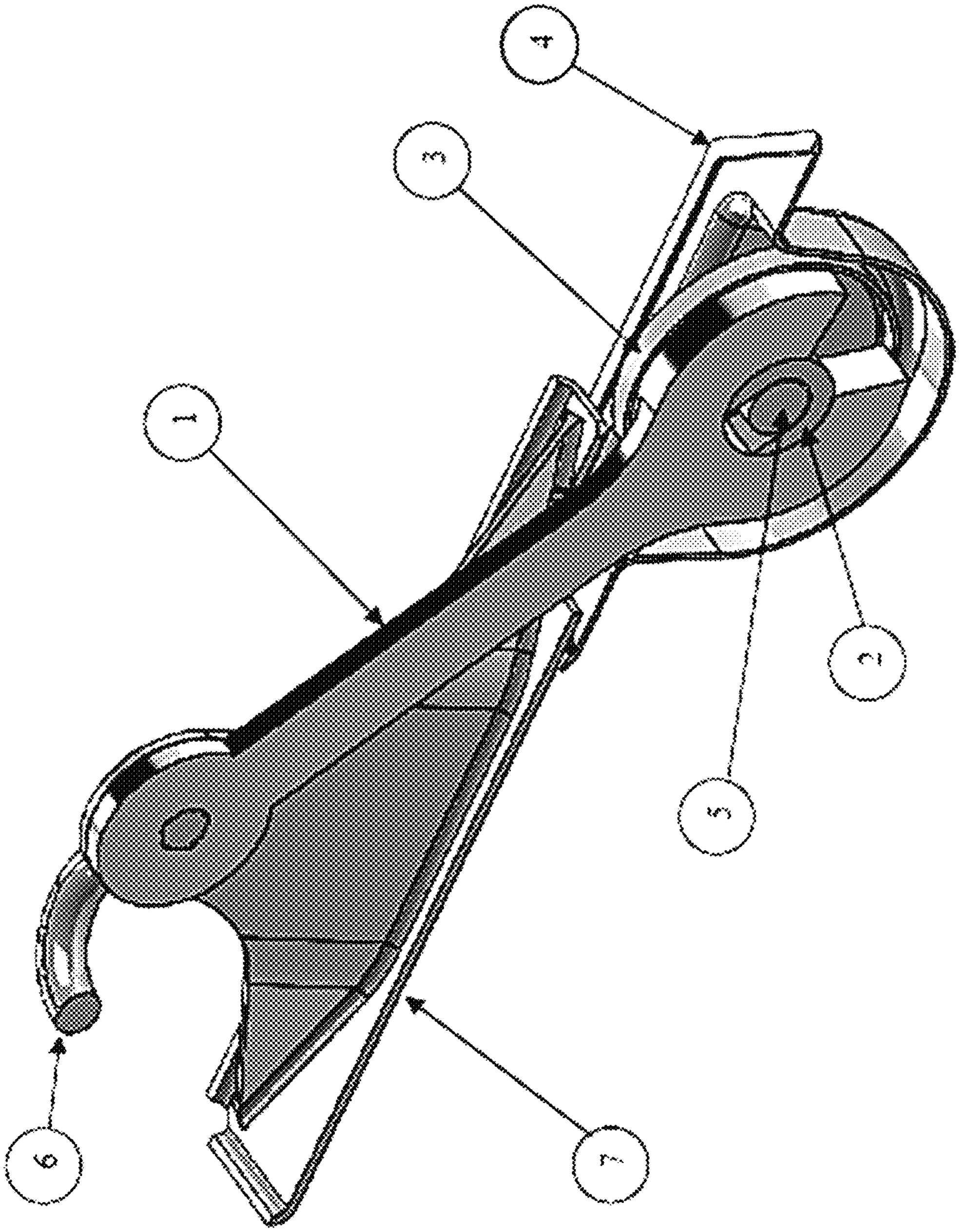
FIG. 2 is a sectional rendering of the perspective view of the inventive tumbler clasp mechanism shown in FIG. 1.
Figure 3:
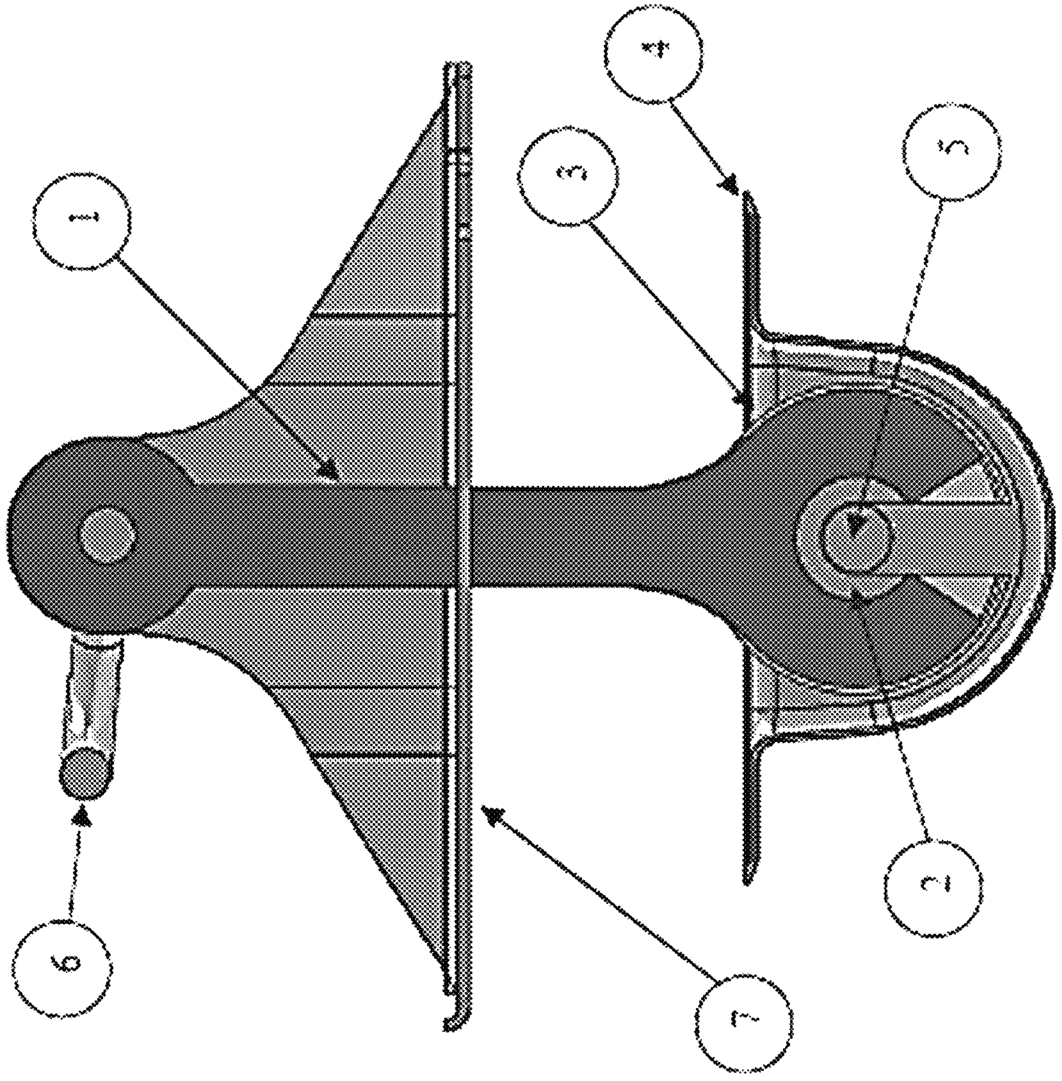
FIG. 3 is a front elevation sectional view of the inventive tumbler clasp mechanism shown in FIG. 1.

FIG. 1 through FIG. 3 are illustrative of a first exemplary embodiment of the present invention. The first exemplary inventive embodiment is an earlier inventive embodiment and is referred to herein as the present invention's "Tumbler Clasp" or "Tumbler Clasp Mechanism." FIG. 4 through FIGS. 10A and 10B are illustrative of a second exemplary embodiment of the present invention. The second exemplary inventive embodiment is a more recent inventive embodiment and is referred to herein as the present invention's "Smart Hook" or "Smart Hook Prototype." The present inventors made and tested a prototype of the second exemplary inventive embodiment and confirmed its efficacy.

With reference to FIGS. 1 through 3, the present inventors conceived and developed the first exemplary inventive embodiment in order to fit a lifting point into a location that a typical hook or shackle cannot reasonably fit. The inventive tumbler clasp mechanism utilizes an outer cylindrical structure 1, an inner cylindrical structure 2, and caps 3 that hold the two cylindrical structures 1 and 2 in place. The present inventors designed this tumbler clasp mechanism embodiment to be suitable for fitting a hooking point such as depicted in FIG. 1 through FIG. 3. The caps 3 are attached to the inner cylinder 2 and can be rotated and locked to be either opened or closed. When loaded, the bar 5 bears down on the inner cylinder 2, which in turn bears down on the outer cylinder 4. The caps 3 (which are connected by hardware to the inner cylinder 2 and have an outer lip that goes around the edge of the outer cylinder 4) also function to prevent the outer cylinder 4 from opening up under load, distributing some of the force along the contact surface.

FIG. 1 and FIG. 2 depict the full assembly of the inventive tumbler clasp mechanism wherein the inner cylinder 2 and caps 3 are rotated closed (counter-rotated to the opening of the outer cylinder 1) to capture a bar 5 inside of a pocket 4. FIG. 3 depicts the full assembly of the shown inventive tumbler clasp mechanism embodiment wherein the inner cylinder 2 and caps 3 are rotated open (rotated to align the opening to the outer cylinder 1) to enable the capture of a bar 5 inside of a pocket 4. As shown in FIGS. 1 through 3, the inventive tumbler clasp mechanism has a connected shackle 6 for a sling to attach thereto, and a footpad 7 to distribute a component of an angled sling load over a surface. FIG. 2 and FIG. 3 each depict a "half-section" of the inventive tumbler clasp mechanism so as to show inner cylinder 2, which is hidden in FIG. 1.

Figure 7B:
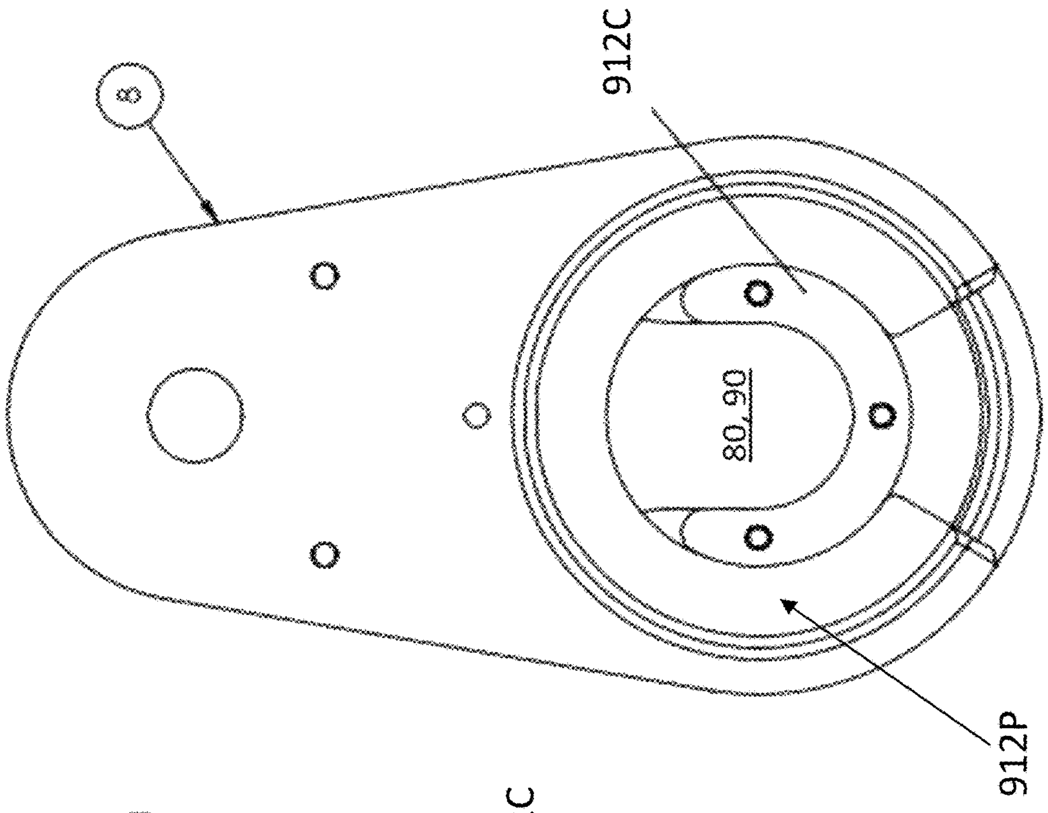
FIG. 7B is a front perspective view, corresponding to the view of FIG. 7A, of the inventive smart hook prototype shown in FIG. 4.
Figure 7A:
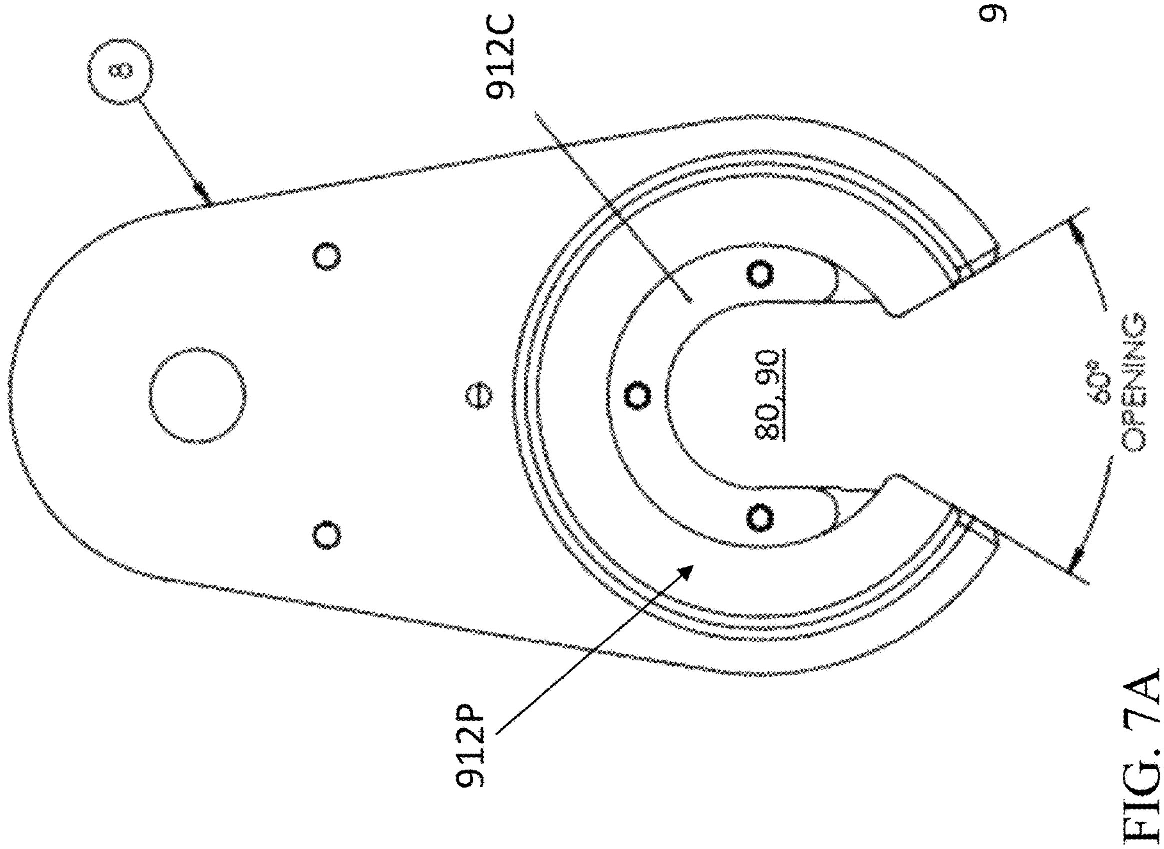
FIG. 7A is a front perspective view of the inventive smart hook prototype shown in FIG. 4.
Figure 8:
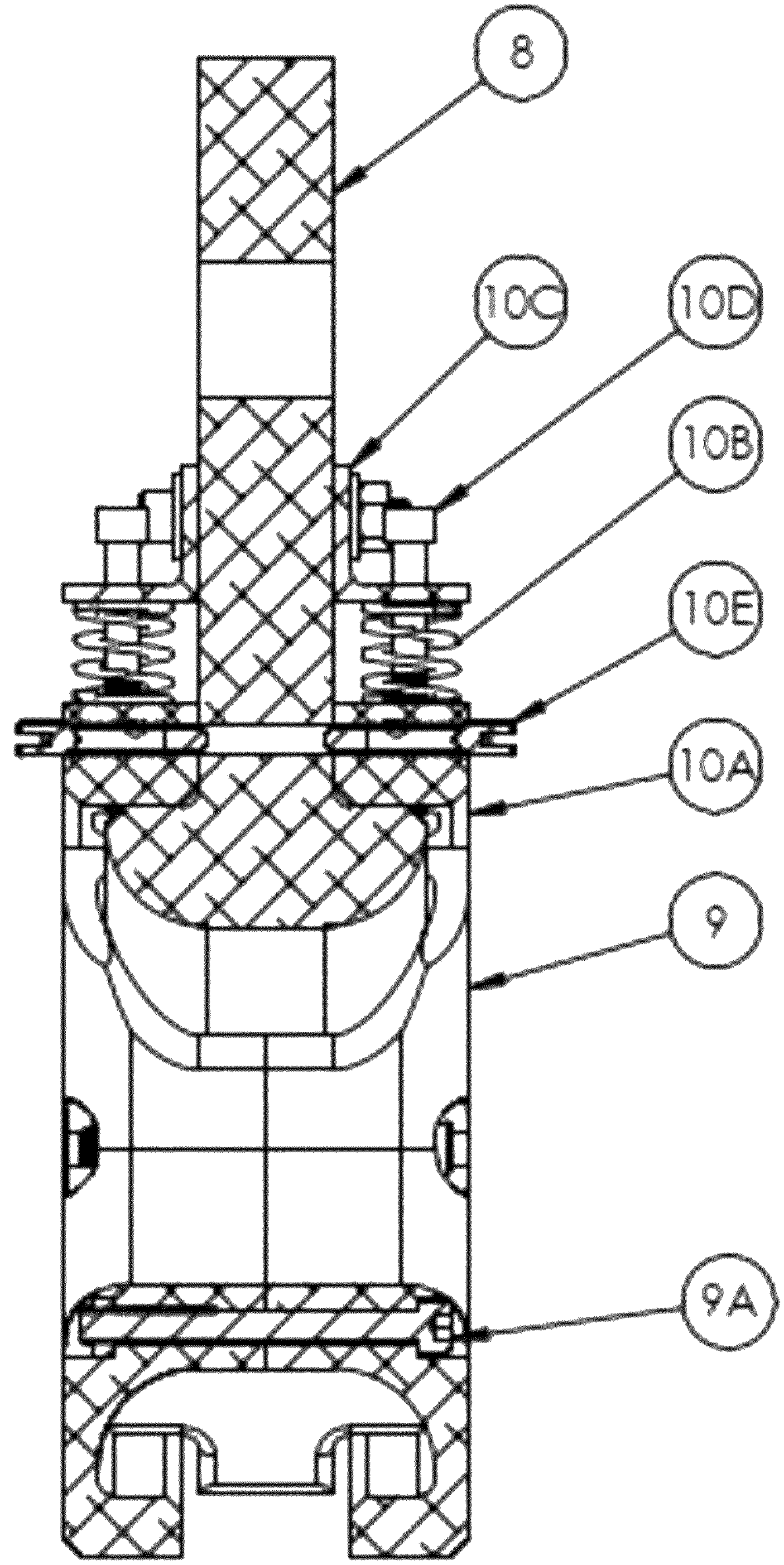
FIG. 8 is a side elevation sectional view of the inventive smart hook prototype shown in FIG. 4.
Figure 9:
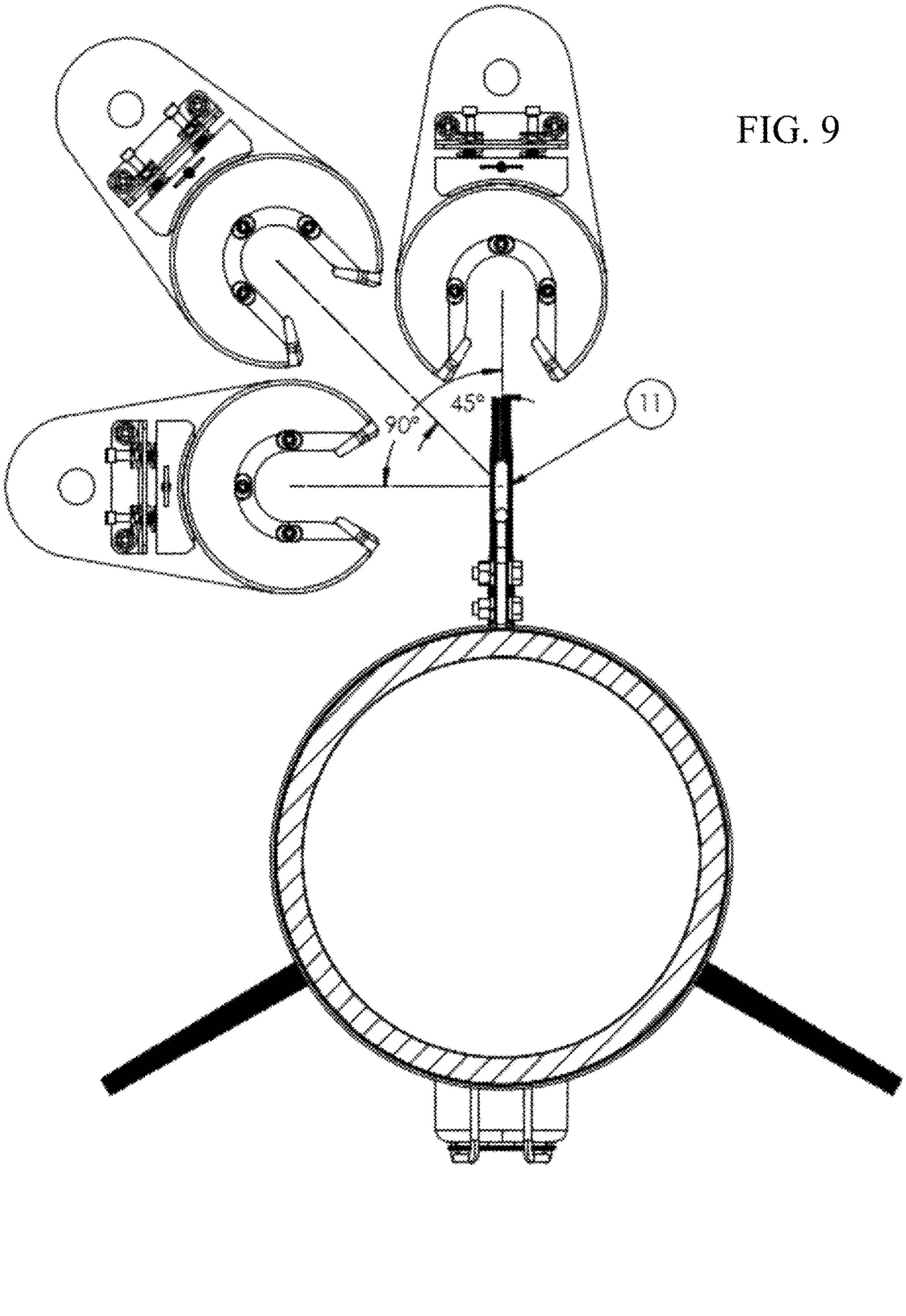
FIG. 9 is a frontal/front perspective view of an unmanned underwater vehicle (UUV) and, attached thereto, the assembled inventive smart hook prototype shown in FIG. 4.

With reference to FIGS. 4 through 10B, the present inventors conceived and developed the second exemplary inventive embodiment in order to fit a lifting point with an opening that allows the captured element to translate directly/linearly into the hooking mechanism (for instance as illustrated in FIG. 9), without the need to maneuver around a hook. The inventive technology exemplarily depicted in FIGS. 4 through 10B can be utilized with diverse applicability, for instance between plural/multiple platforms for the capture and release of objects requiring a hook. To some degree the present inventors incorporated, in their smart hook prototype shown in FIGS. 4 through 10B, design aspects of their tumbler clasp mechanism shown in FIGS. 1 through 3. In this regard, the illustrated embodiment of the inventive smart hook prototype utilizes elements of an embodiment of the inventive tumbler clasp mechanism. As currently reduced to practice, the inventive smart hook prototype is manually operated. However, the present inventors conceive and envision that their smart hook prototype can be fitted with sensors and actuators to facilitate actuation of the rotating cylinders 9.

According to exemplary inventive practice, the present invention's smart hook is intended to be used to autonomously or manually capture and release any hooking point, such as may be found on vessels including but not limited to small craft, unmanned underwater vehicles, and unmanned surface vehicles. Generally speaking, unmanned vehicles are autonomous or remotely controlled or some combination thereof. Depending upon the inventive embodiment, exemplary practice of the present invention may provide for automatic/automated operation, or manual operation, or both kinds of operation, of the inventive device. Automatic/automated operation of an inventive device may be autonomous and/or remotely controlled. According to a notable example of preferred inventive practice, an inventive smart hook represents an autonomous sensing-and-capture hook and allows for autonomous capture and containment of objects in difficult-to-reach or dangerous locations, such as but not limited to overhead crane loading, places with limited access where a person cannot normally fit, places with pinch points, and unmanned vessels where a person is not available to manually capture and release a hook.

Figure 5:
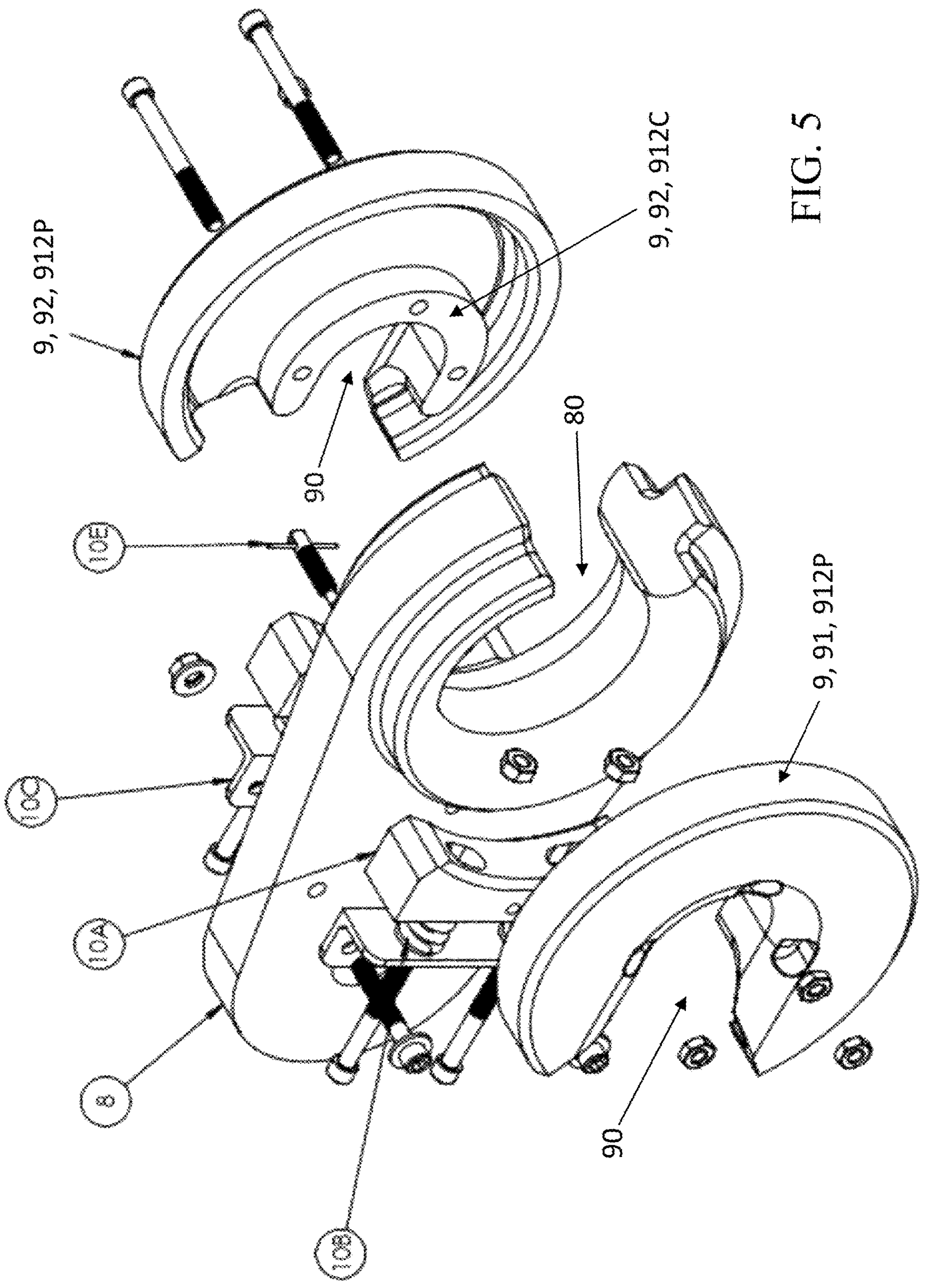
FIG. 5 is an exploded rendering of the perspective view of the inventive smart hook prototype shown in FIG. 4.

The present invention's smart hook, as exemplarily embodied, includes two main components, viz., a hollow substantially cylindrical outer structure 8 and a hollow substantially cylindrical inner structure 9. The cylindrical inner structure 9 includes two adjoining hollow substantially cylindrical structures, viz., hollow cylindrical inner structures 91 and 92. Each of the hollow cylinders 8, 9, 91, and 92 is "generally" cylindrical insofar as generally describing the shape of, but being more complexly configured than, a geometric right circular cylinder. Referring to FIGS. 5, 7A, and 7B, each of the inner cylinder halves 91 and 92 includes an inner or central portion (indicated as hub 912C) and an outer or peripheral portion (indicated as cap 912P). Each cylinder is characterized by a geometric longitudinal axis and a cross-sectional (in radial section) "C"-shape, wherein the cylinder does not extend circumferentially around its entire circumference. Instead, the cylinders each define an axial-longitudinal gap constituting a substantially linear channel that extends parallel to the longitudinal axis of the cylinder. As shown in FIGS. 5, 6A, 6B, 7A, and 7B, outer cylinder 8 has a gap 80, and inner cylinders 91 and 92 each have a gap 90. The assembled inventive device has a gap 890, which represents a coincidence of gaps 80 and 90.

Figure 4:
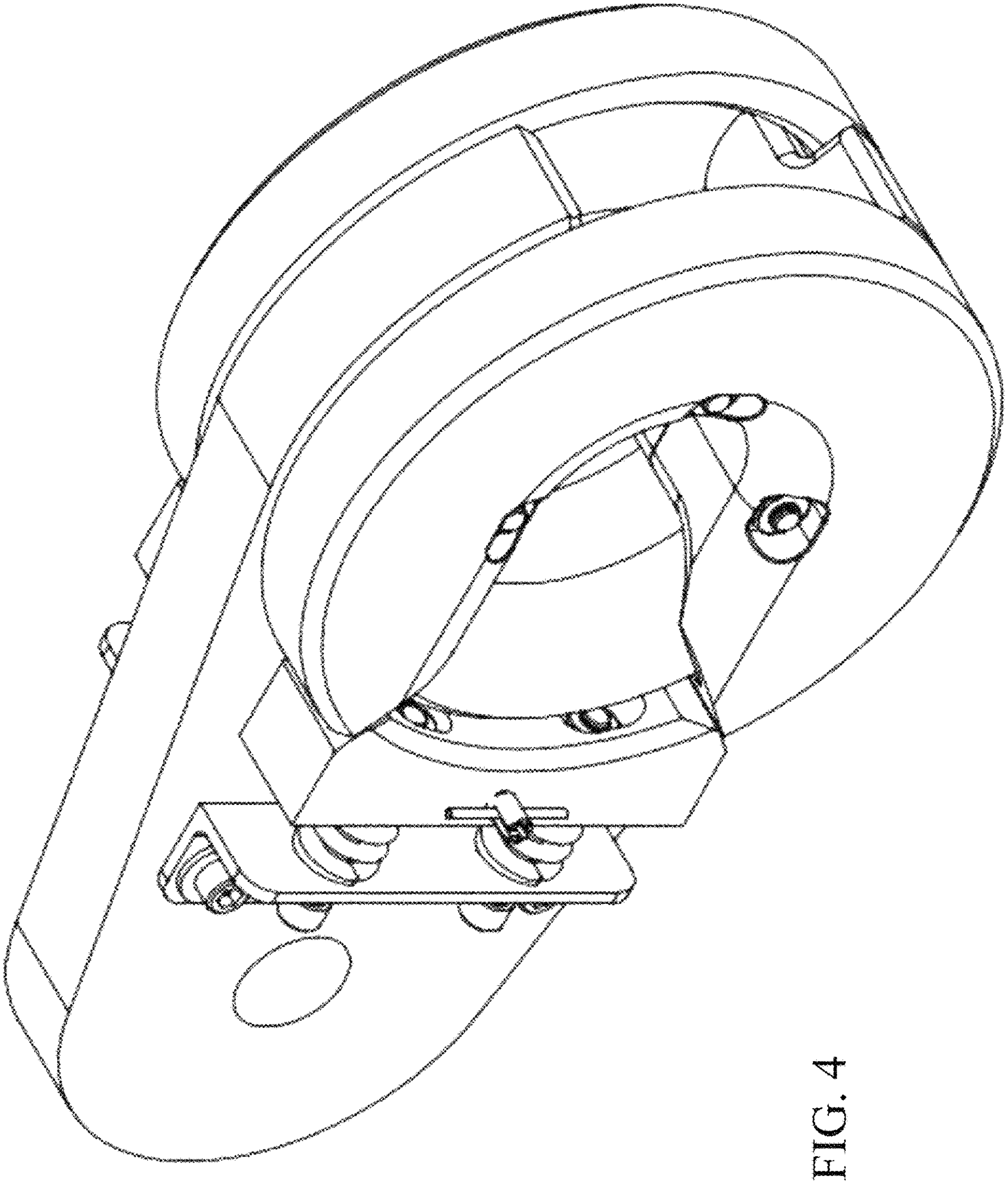
FIG. 4 is a perspective view of a second example of practice in accordance with the present invention.
Figure 10B:
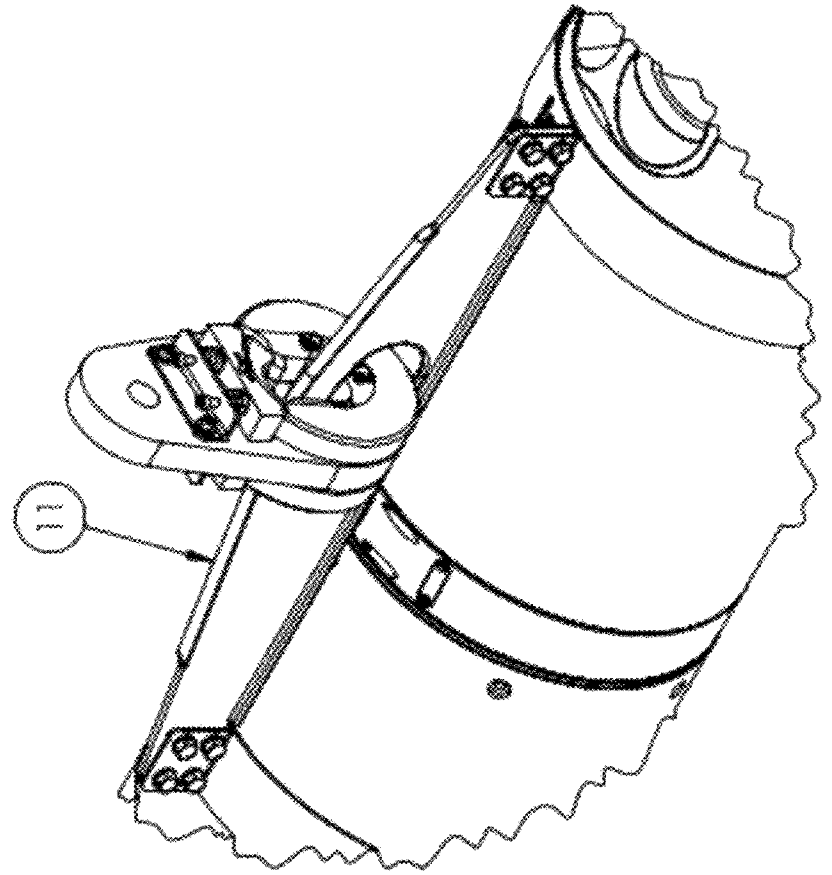
FIG. 10A and FIG. 10B are each a perspective view of a portion of an unmanned underwater vehicle (UUV) such as shown in FIG. 9 and, attached thereto, the inventive smart hook prototype shown in FIG. 4. As similarly shown in FIG. 10A and in FIG. 10B, but with different means or orientations of attachment, the inventive smart hook prototype is attached to the UUV and is "closed."
Figure 10A:
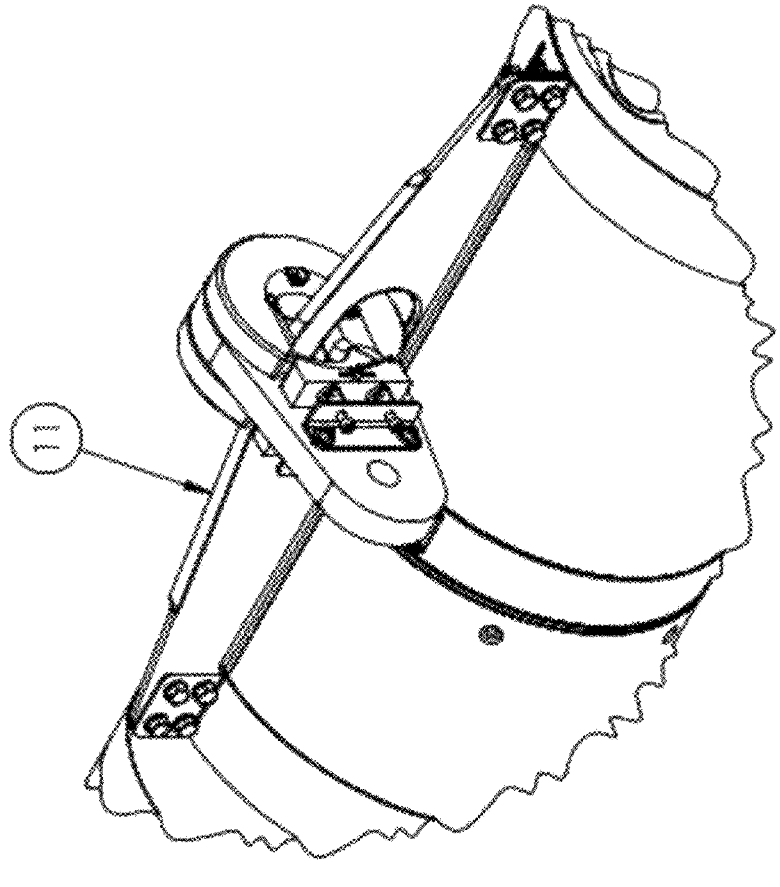

The present inventor's smart hook device (exemplarily shown in FIGS. 4 through 10B) bears some comparison to the inventive tumbler clasp device (exemplarily shown in FIGS. 1 through 3) insofar as the inventive tumbler clasp device combines the caps 3 with the inner cylinder 2. As shown in FIG. 4 and FIG. 5, the inventive smart hook includes an inner cylinder 9 having an integral construction wherein inner cylinder 9 is splittable into inner cylinder halves 91 and 92, which are adjoinedly combinable (or re-combinable) to form (or re-form) inner cylinder 9. The two congruous hollow inner cylinders 91 and 92 are equally sized and configured and can be coupled axially-longitudinally end-to-end to form inner cylinder 9. For instance, a fastening device including at least one fastener 9A such as shown in FIG. 8 may be used to join together the cylindrical halves 91 and 92 to form the cylindrical whole 9. These and other inventive features reduce the number of components and expand the potential connection points. An example of a possible connection point that is suitable for inventive practice is a flat plate with a cutout 11 ("strong back") that is affixed to and typically used to lift UUVs, such as illustrated in FIG. 9, FIG. 10A, and FIG. 10B in association with an embodiment of the inventive smart hook.

Figure 6B:
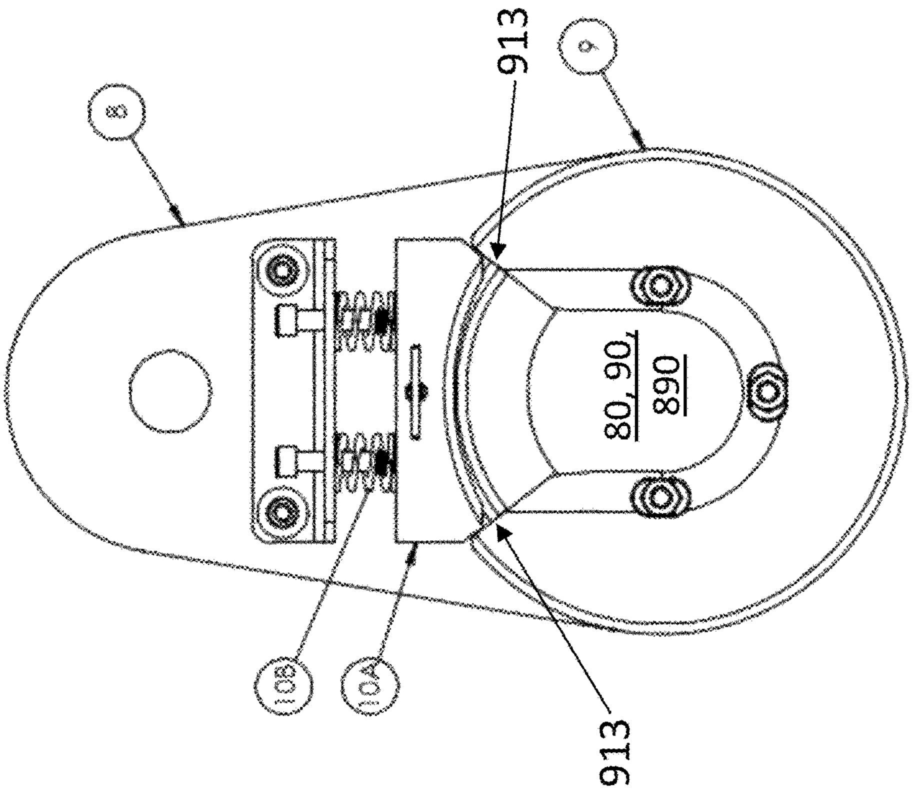
FIG. 6B is a front perspective view, corresponding to the view of FIG. 6A, of the inventive smart hook prototype shown in FIG. 4.
Figure 6A:
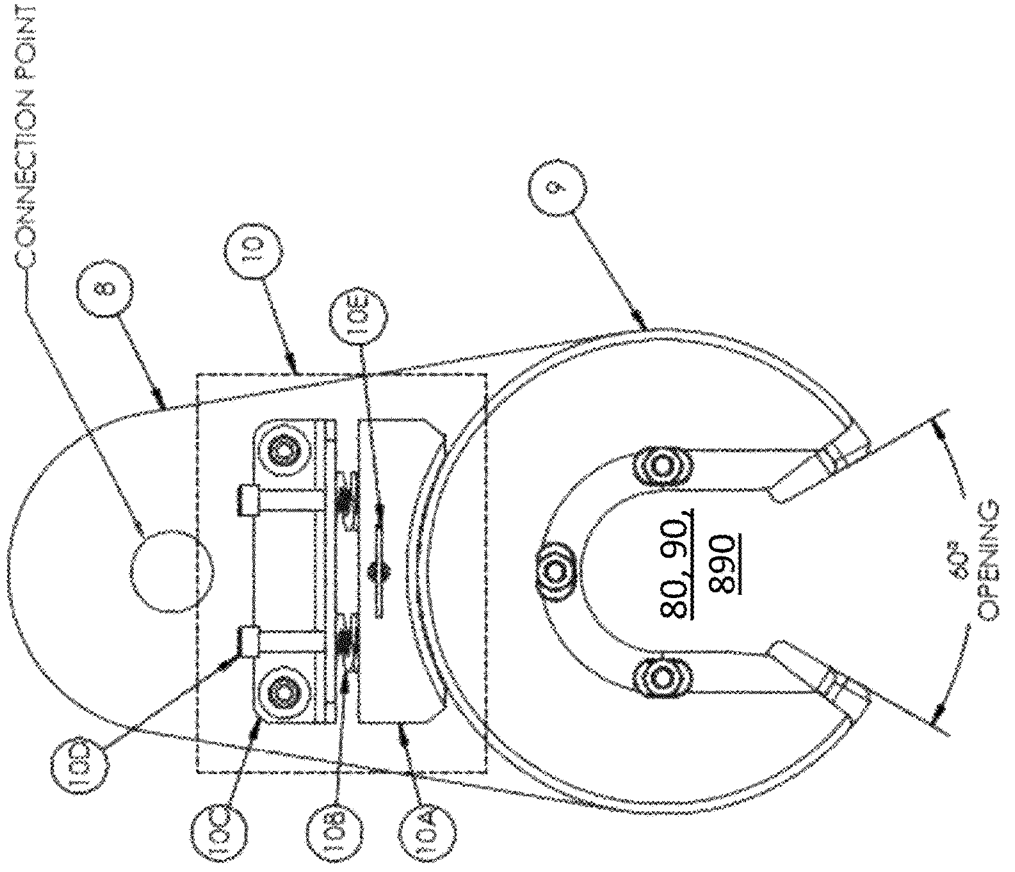
FIG. 6A is a front perspective view of the inventive smart hook prototype shown in FIG. 4.

When the inner cylinder 9 is rotated to the closed position, such as depicted in FIGS. 6B and 7B, the compression springs 10B push the stop block 10A downward, along the length of the bolt-like members 10D, from the mounting plate 10C and into the angled sixty-degree opening (gap 90) of the inner cylinder 9. When stop block 10A is pushed downward by compression springs 10B into gap 90 to approximately maximum extent, stop block 10A is adjacently interposed between cap 912P's circumferential ends 913, which border upon gap 90. As shown in FIG. 6B, a first portion of stop block 10A is contiguous a portion of a first circumferential end, and a second (opposite) portion of stop block 10A is contiguous a portion of a second circumferential end. Thus situated in its down position, stop block 10A "stops" (e.g., obstructs or impedes) inner cylinder 9, thereby preventing rotation of inner cylinder 9. That is, stop block 10A maintains cap 912P and hence inner cylinder 9 in a fixed position so that inner cylinder 9 cannot rotate.

A variety of locking mechanisms may be implemented in accordance with the present invention. A locking mechanism such as locking mechanism 10 is used to prevent the inner cylinder 9 from rotating open when in the closed position. As shown by way of example in FIGS. 6A and 6B, locking mechanism 10 (indicated in FIG. 6A) includes a mounting plate 10C, a stop block 10A, at least two compression springs 10B, a retractable spring plunger (with T-handle) 10E, and hardware that includes at least two bolt-like elongate members 10D. Locking mechanism 10 is used for mechanical enhancement of the stationary (non-rotatable) condition of inner cylinder 9 while inner cylinder 9 is in the closed position. The stop block 10A can be secured in this down position in any of various ways, depending upon the inventive embodiment. As an example of inventive practice, once the stop block 10A is in this fully downward position, the retractable spring plunger 10E will engage and drop a pin into a hole such as shown in FIG. 8.

To return this inventive smart hook embodiment to the open position, the retractable spring plunger 10E is manually retracted to allow the stop block 10A to be pulled back up toward the mounting plate 10C, thereby allowing free rotation of the inner cylinder 9. Alternatively, an inventive smart hook can be embodied to afford full automation, as distinguished from requiring human manual physicality. According to exemplary practice of an inventive smart hook that is automated, the locking mechanism 10 differs from that shown in FIGS. 6A and 6B, in order that the retractable spring plunger 10E and the stop block 10A can be electronically actuated.

FIGS. 7A and 7B depict the inventive smart hook with the locking mechanism 10 and front-facing inner cylinder 9 removed in order to show the interface between the back facing inner cylinder 9 and the outer cylinder 8. FIGS. 7A and 7B also show the smart hook's sixty-degree aperture that facilitates ease of alignment to the connection point, such as a UUV strong back 11 shown in FIG. 9. FIG. 8 is a section view of the inventive smart hook and shows the concave internal opening of the two inner cylinders 9 and the hidden interfacing surfaces between the depicted components.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. An attachment apparatus comprising a generally cylindrical inner structure, a generally cylindrical outer structure, a spring device, and a blocking member, wherein:

said generally cylindrical inner structure and said generally cylindrical outer structure are coaxially combined;

said generally cylindrical inner structure is characterized by a "C"-shaped cross-section and a longitudinal opening extending at least a portion of the length of said generally cylindrical inner structure;

said generally cylindrical outer structure is characterized by a "C"-shaped cross-section and a longitudinal opening extending at least a portion of the length of said generally cylindrical outer structure;

said spring device and said blocking member are connected to each other;

said generally cylindrical inner structure is rotatable, relative to said generally cylindrical outer structure;

based on said rotatability, said generally cylindrical inner structure is capable of being set in an open position and a closed position;

according to said open position, said longitudinal opening of said generally cylindrical inner structure and said longitudinal opening of said generally cylindrical outer structure are aligned with each other;

according to said closed position, said longitudinal opening of said generally cylindrical inner structure is rotated so that said longitudinal opening of said generally cylindrical inner structure is situated approximately 180 degrees from where said longitudinal opening of said generally cylindrical inner structure is situated according to said open position;

during said closed position, said blocking member is caused by said spring device to move into said longitudinal opening of said generally cylindrical inner structure so as to at least substantially prevent rotation of said generally cylindrical inner structure by abutting said cylindrical inner structure.

2. The attachment apparatus of claim 1, further comprising a locking mechanism for locking said generally cylindrical inner structure into a non-rotatable condition during said closed position.

* * * * *